Oct. 28, 1947.   D. BIERMANN   2,429,665
VARIABLE PITCH PROPELLER
Filed March 20, 1944   2 Sheets-Sheet 1

*INVENTOR.*
DAVID BIERMANN
BY Bruno C. Lechler
ATTORNEY

Oct. 28, 1947.  D. BIERMANN  2,429,665
VARIABLE PITCH PROPELLER
Filed March 20, 1944  2 Sheets-Sheet 2

INVENTOR.
DAVID BIERMANN
BY *Bruno C. Lechler*
ATTORNEY

Patented Oct. 28, 1947

2,429,665

UNITED STATES PATENT OFFICE 2,429,665

VARIABLE PITCH PROPELLER

David Biermann, Blue Island, Ill.

Application March 20, 1944, Serial No. 527,177

15 Claims. (Cl. 170—161)

This invention relates to variable pitch propellers.

Variable pitch propellers the blades of which are capable of changing their pitch under the influence of various forces acting on the blade are known. Many designs for different types of such variable pitch propellers have been suggested, all of these designs seeking to utilize selected forces to bring about such a change of position of the blades that, notwithstanding wide variations in the thrust, the engine will be able to operate at a constant rotational speed with maximum efficiency.

While various combinations of the forces acting on the blade have been used to bring about this change of pitch of the blades, these propellers have generally been so constructed that the blade as a whole turns about the axis of the root of the blade. In most cases this axis about which the entire propeller blade is turned extends radially of the hub. These variable pitch propellers of the prior art have generally been very complicated, costly and heavy. Because of the very large centrifugal forces which tend to pull a blade out of its hub, any design that involves the rotation of the blade about its axis requires a complicated construction to support the blade. The high axial stress creates friction tending to prevent the blade from freely turning about its axis and this makes the device unreliable. Furthermore, to house the complicated mechanism needed to support the blades a very large and heavy hub is necessary and because of its large diameter the hub obstructs the flow of air. This makes this design impracticable for use in small propellers such as are used for the smaller sizes of planes.

It is an object of the invention to provide a variable pitch propeller of a simple and inexpensive construction that is capable of maintaining its efficiency substantially undiminished over a wide range of flight conditions.

It is a further object of the invention to provide a reliable variable pitch propeller of a simple design that is also practical for small planes.

Another object of the invention is to provide a variable pitch propeller which retains much of the simplicity of the constant pitch propeller yet is capable of varying its pitch as effectively as the more complicated automatic propellers.

Another object is to provide for automatically changing the pitch of a propeller by moving only a portion of the blade containing the tip and trailing edge relative to a fixed pitch portion attached to the hub that includes most of the leading edge.

Another object is to provide a propeller whose pitch is automatically altered to maintain a substantially constant engine speed under the action of the forces of thrust and centrifugally responsive weights attached to the movable section of the blade, both forces acting on that movable section.

Another object is to provide a propeller whose pitch is automatically altered to maintain a substantially constant engine speed by the action of two opposed groups of forces acting on a movable flap forming a part of each blade, thrust being opposed to the combined forces exerted by centrifugally responsive weights and resilient means, both attached to the flap.

Another object is to provide a propeller each of whose blades has a movable flap that continually assumes a position in which the forces acting on it neutralize each other, wherein changing flight conditions will so alter the individual forces that the position the flap thus assumes will maintain a substantially constant speed of rotation under all conditions, one of said forces resulting from centrifugal action on weights carried by the flap, this force varying in amount both with the propeller speed and with the pitch of the flap.

Another object is to provide a propeller whose blades have a movable section, the position of which will automatically be changed under changing flight conditions to maintain a constant propeller speed without requiring a change of propeller speed to bring these forces into action but which will, upon failure of the pitch changes to hold the constant speed, increase one of the forces determining the blade pitch in such manner as to sharply limit the variations of the actual speed from the desired constant speed.

To achieve these and other objects which will appear as the description proceeds, the invention provides for changing the pitch of only a part of each propeller blade, the rest of the blade being rigidly attached to the hub just as in an ordinary constant pitch propeller. Each blade is thus composed of a fixed and a movable portion, the movable portion being supported on the fixed portion by a hinge.

The hinge preferably extends diagonally across the blade in such a manner that the fixed portion of the blade, which extends between the hinge and the hub, includes the major part of the leading edge of the blade. The movable part of the blade, lying on the other side of the hinge, includes the tip and the major part of the trailing edge of the blade.

Many designs employ centrifugally responsive weights whose effectiveness changes only when the speed of the propeller varies. As the propeller is in fact the governor of the engine, there is a definite disadvantage in using a controlling force that does not come into action until the speed that is to be maintained has already been lost. The limits within which such controls can maintain a desired speed are apt to be spread rather wide.

In contrast to such designs I have found that by mounting the centrifugally responsive weights in proper position on the flap of the propeller the effectiveness of these weights can change even while the propeller is running at constant speed. In this manner the necessity for the speed of the propeller to change to develop pitch changing forces may be so minimized by the proper automatic adjustments of the pitch at the desired speed that, under the most favorable conditions the change in effectiveness of the weight due to changing propeller speed may not be needed at all except in an emergency.

Under the most adverse conditions—and it must be recognized that there are many unforeseeable factors that affect the operation of a propeller, the tendency of the engine to change speed is so greatly reduced that only a very slight change in speed is needed to so change the effectiveness of the centrifugally responsive weights that speed changes are held within the narrowest practicable limits.

So mounting the centrifugally responsive weight that its effectiveness in changing the pitch varies with the position the flap assumes under the action of all the forces and also with the change of propeller speed, is one of the distinctive features of the invention.

I have found that the movable portion of the blade, or for short the flap, may be held at the proper initial pitch angle by attaching a centrifugally responsive weight in a suitable position on the flap. This centrifugal weight may be mounted on the flap by an arm whose angle relative to the flap can be adjusted. The magnitude of the moment produced by this weight depends both upon the angle that a line passing through the hinge and the weight makes with the shaft axis and the mass of the weight. By choosing the proper angle and a corresponding mass for the weight, the moment tending to turn the flap about the hinge will not only be correct to secure the initial pitch angle but may also be made to increase or decrease as the flap is deflected in a given direction, in any desired manner.

Another force tending to turn the flap about the hinge is the thrust. If the design of the propeller is such that the two forces just mentioned, that is the centrifugal force on the weight and the thrust, are the only forces acting on the flap, the flap will be in balance if the moment created by the centrifugal weight is equal and opposite to the moment created by the thrust. If the flap moves as a result of changing thrust, the centrifugal weight will move closer to or farther from the propeller shaft axis and the amount of centrifugal force exerted by the weight on the flap will change. At the same time, as the flap turns about the hinge axis, the lever arm of the weight will change. The initial angle of the weight may be so selected that for the limited range through which the pitch is allowed to vary the moment exerted on the flap by the weight will remain substantially constant. This will be true if the initial angle is so chosen that the lever arm decreases when the centrifugal weight is moving further from the axis, or vice versa.

In the preferred embodiment of my invention I use a resilient plate to hinge the two portions of the blade. These edges of the plate are rigidly attached to each of the two portions of the blade respectively, the plate being stressed as the hinge bends. Friction is thus avoided and at the same time the resilient plate provides a convenient means for influencing the pitch of the flap. As the pitch of the flap decreases from its maximum, the resilient plate will exert a moment increasing with the angle by which the maximum pitch is decreased. The size of this moment may be varied by properly selecting the material and the thickness of the hinge plate. Thus, the spring plate influences the pitch of the flap in opposition to the thrust whose action tends to deflect the flap in a pitch-reducing direction. Since the centrifugal weight previously mentioned is also tending to increase the pitch, it will be the combined moment of the spring plate and of the centrifugal weight which creates the balance with the changing thrust moment when the flap is set at a pitch that will maintain a substantially constant rotational speed of the propeller.

In the actual design of a propeller the position and size of the centrifugally responsive weight required may be modified by moments exerted on the flap by other forces than the centrifugally responsive weight, the spring hinge, and the thrust. For example, it may not be practicable to so place the hinge that the centrifugal force acting on the flap will not create an extra moment. An allowance may have to be made for any such moment in determining the size and position of the weight. If this extra moment tends to increase the pitch, the centrifugally responsive weight need exert only what additional moment is necessary to balance the moment for the thrust and of the hinge plate. The moment exerted by the centrifugal force may even be greater than necessary to balance the resultant of the thrust moment and the hinge plate moment, in which case the centrifugally responsive weight may have to exert a negative moment, that is, it may have to be so placed that it will decrease, rather than increase, the pitch.

It has now been shown that by merely selecting the proper size of weight and bearing in mind whether a positive or negative moment is needed in choosing its position relative to the flap with which it turns about the hinge, the resultant of all the moments exerted on the flap under any flight condition can be made to become zero at a pitch which will give the same engine speed for a wide range of operating conditions.

Also that in this selection other moments that are present can be offset provided those moments have a known value for a given position of the flap.

The invention will now be more fully described and reference will be had to the accompanying drawings.

Figure 1:
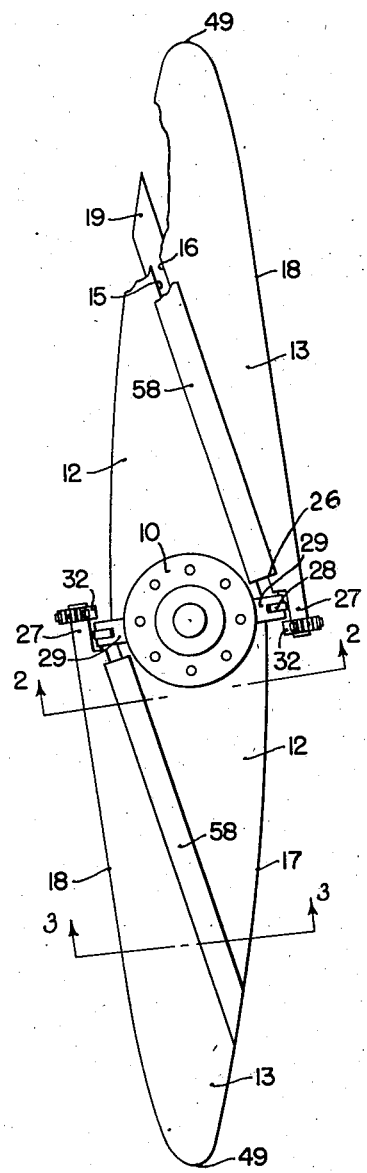
Fig. 1 is a front view of a propeller embodying the invention.
Figure 2:
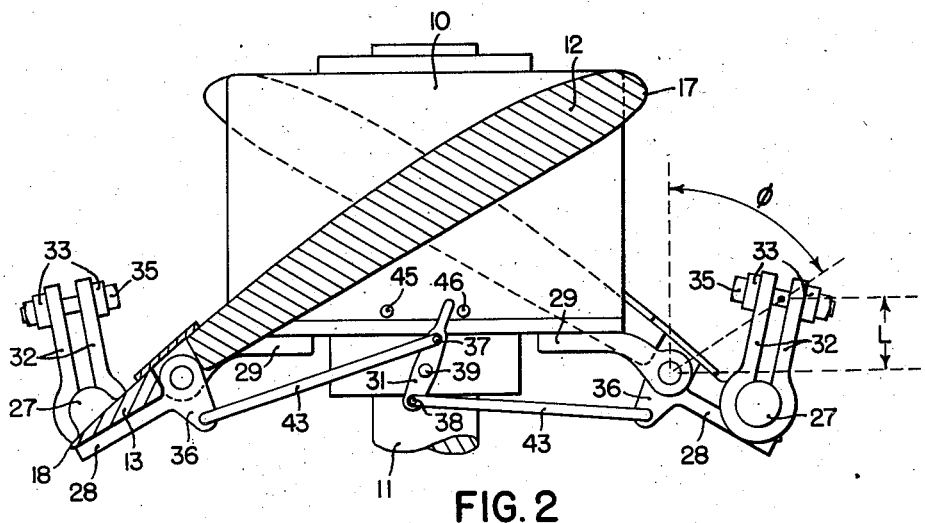
Fig. 2 shows a section taken on the line 2—2 of Fig. 1 on an enlarged scale.
Figure 3:
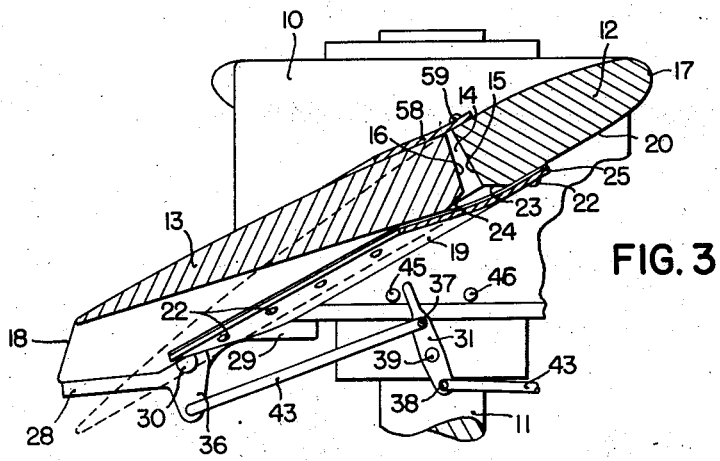
Fig. 3 is a section taken on the line 3—3 of Fig. 1.

The propeller shown in Figs. 1–3 has a hub 10 rigidly mounted on the engine shaft 11 and rotating therewith. Hub 10 carries propeller blades, each blade consisting of two sections 12 and 13. The inner section 12 of each blade is rigidly attached to, or forms a part of, the hub 10 while the outer section, or flap 13 of each blade is movably supported on the outer end of the fixed section 12.

The surface of the two sections 12, 13 of each blade are continuations of each other except that they are separated from each other by a space 14 defined by parallel plane surfaces 15, 16 that form the ends of the fixed and the movable section, respectively. The two blade sections 12, 13 of each blade may be conceived as parts of a single blade that were set apart by two parallel saw cuts creating planes 15, 16.

The planes 15, 16 extend diagonally across the blade in such a manner that a large portion of the blade is fixed to the hub 10 and most of the leading edge 17 of the blade is included with this fixed portion 12, whereas substantially all of the trailing edge 18 of the blades and also the tip 49 thereof are part of the movable section. At the trailing edge side of the blade the plane 15 passes close to the hub 10.

The movable flap 13 is supported on the fixed section 12 of the blade by means of a spring hinge plate 19 attached to the under surfaces 20, 21 of the fixed section 12 and the flap 13 of the blade, respectively. Spring plate 19 bridging across planes 15, 16, extends across the blade from the leading edge 17 to a point 26 a short distance from the trailing edge 18. The plate 19 is preferably made of spring brass or stainless steel and each side of the plate is rigidly fastened to one of the surfaces 20, 21 by adhesive, rivets, or screws 22. To distribute the flexure over a wider hinge plate area, the edges of the two portions 12, 13 of each blade next to the plate 19 may be cut back as shown at 23 and 24 in Fig. 3. A rubber sheet 25 may be placed under the spring hinge 19 to avoid local stress concentrations on the bearing surfaces. The thickness and characteristics of the hinge plate material are so chosen that the movable section 13 of each blade has a definite bias, tending to assume or maintain the position shown in dotted lines in Fig. 3.

As has been mentioned, the spring plate 19 does not extend quite to the trailing edge 18 of the blade, leaving an end portion 27 of the flap 13 extending beyond the end 26 of the spring plate 19. This end portion 13 is supported by one leaf 28 of the hinge 28, 29. This hinge has a hinge pin 30 and is attached by means of its second leaf 29 to the hub 10. The end portion 27 of the flap 13 is thickened considerably, both to permit attachment to the hinge leaf 28 and to support an arm 32. The arm 32 may be a clamp whose angular position with respect to the flap end 27 may be adjusted for a purpose to be described presently. It may carry weights 33. The size of these weights 33 may be varied according to requirements and they and the arm are held in place by a bolt 35.

The flap ends 27 of the two propeller blades are coupled together so that both flaps move together. Each hinge leaf 28 may have an arm 36 and by means of links 43 each of these arms may be connected to a rocker 31 by pivots 37 and 38 respectively. The rocker is supported on the hub 10 at 39 and may be limited in its movement by stops 45, 46 which set limits to the maximum and minimum pitch to which the variable propeller can adjust itself.

To avoid an undesired circulation of air over the tip of the propeller blade into the space 14, a cover plate 58 is provided for each blade. This covers space 14 on the side opposite the hinge plate 19. This cover plate 58 may be a flexible strip attached to the fixed blade section 12 by rivets or screws 59.

Figure 4:
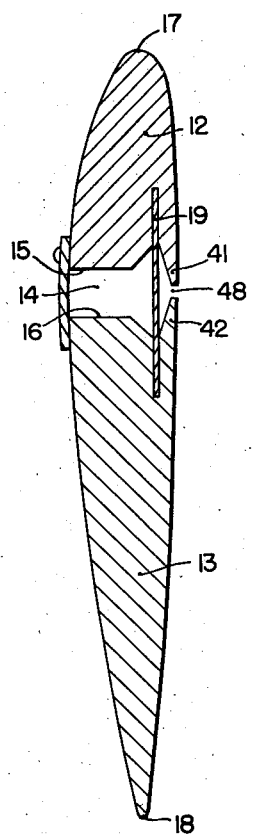
Fig. 4 is a section through an alternate form in which the propeller blade is made of laminar material.

It will be understood that while spring hinge 19 and cover plate 58 are shown in the drawing as projecting above the blade surface, this is done only to show the construction more clearly. Actually these elements will be sunk into the blade surface. If the blades are made of laminar material, the hinge plate 19 may be anchored between the laminations, preferably near the underside of the blade as shown in Fig. 4. The blade sections may be cut back as at 41 and 42 and the surface 20, 21 may approach each other quite closely as indicated at 48.

As the propeller revolves, three moments affect the pitch of the movable flap 13 of the propeller blades: the thrust moment tending to reduce the pitch angle and, opposing the thrust moment, a moment provided by the centrifugal weight 33 and a moment introduced by the spring hinge 19. The variations in thrust moment as a consequence of variations in air speed are at all times to be balanced by variations in the sum of the moments exerted by the centrifugal force and the spring 19. To move the flap 13 from the maximum pitch position shown in dotted lines in Fig. 3 to the position shown in full lines in Fig. 3, the resistance of the spring hinge 19 to the flexure must be overcome. The flap can move only about on the axis determined by the hinge pin 30 that passes through the space 14 and in moving in the full line position in Fig. 3 decreased.

The moment created by the centrifugal force acting on weights 33 is a function of the propeller speed, the size of the weights 33, the effective lever arm L and the angle $\phi$ included between a line connecting the center of the hinge pin 30 with the center of the weights 33 and a line parallel to the axis of the shaft 11.

I have found that the relative moments to be provided by spring 19 and weights 33 in balancing the thrust moment can be varied within wide limits by the proper selection of the initial position of centrifugal weights 33; that is, the position of these weights while the engine is at rest. Within a certain range of $\phi$, which in one embodiment of my invention I have found to extend from 20 to 45 degrees, the moment produced by the centrifugal weight 33 remains substantially constant with a changing value of $\phi$. Therefore, if the initial position of the centrifugal weights 33 is chosen so that their angular movement during flight remains within said limits, the entire compensation for changes in thrust will have to be provided by the spring 19 whose characteristics are to be chosen accordingly. If the weight 33 is set at a much larger initial angle $\phi$, such as 77 degrees, a relatively small angular movement of the weights 33 to increase the angle $\phi$ to, say, 82 degrees, will be sufficient to compensate for the change in thrust moment. This means that in the latter case all the necessary compensation is secured by the action of the weights 33 and the stiffness of the hinge 19 is not needed for this compensation. In any other intermediate position both the centrifugal weight 33 and the spring 19 will contribute to the compensation, and the compensation derived from the centrifugal weight will be the more preponderant the larger the angle φ at which the weight is set. Thus it can be seen that the amount of compensation to be achieved by the weights 33 can be varied by placing the latter at different locations. I prefer to place the centrifugal weight at a relatively small angle φ (for the example given above well above 45 degrees), so that it exerts a moment which remains substantially constant over the pitch changing range, and to rely substantially on the spring 19 for providing the desired variations in the resulting moment that counteracts the variations in the thrust moment.

It should be noted that inasmuch as the effectiveness of the weight 33 varies with the change in the angular setting of the weight 33, the size of this weight must be increased or reduced to suit such different settings. This can be done by loosening the bolt 35 at a selected angle φ, the arm 32 which carries the weight 33 is mounted in an adjustable manner, e. g., shiftable on end portion 27 of the flap. This adjustability of the position of the weights 33 may also be availed of if, after a preliminary setting of the weights 33 at an angle φ, a slight change of this angle should be found desirable to offset unavoidable slight variations in design or other characteristics of individual propellers.

While in the foregoing description I have described my invention with reference to its application to aircraft propellers, it is to be understood that the invention is not limited to air screws for aircraft, but is also applicable to other air screw devices, such as fans. I further desire it to be understood that the invention is not limited to the particular constructional embodiments shown and described hereinbefore, these embodiments having been given as illustrative examples only, since it will be obvious to those skilled in the art that various changes and modifications may be made without departing from the spirit of the invention or the scope of the appended claims.

What I claim is:

1. An air screw comprising a driving shaft, a hub mounted thereon, blades carried by said hub, each blade composed of a fixed-pitch portion rigidly supported on the hub and a movable portion hinged to the fixed portion adapted to vary the pitch, the fixed portion including the major part of the leading edge of the blade while the tip and the major part of the trailing edge are part of the movable portion, means for automatically causing the movable portion to alter its position to maintain the speed and torque exerted by the shaft substantially constant under varying operating conditions, said means including a centrifugally responsive mass operatively connected to said movable portion and resilient means stressed by changes in the relative position of the fixed and the movable portions and means for coupling together the movable portions of all the blades for synchronous movement.

2. An air screw comprising a driving shaft, a hub mounted thereon, blades carried by said hub, each blade composed of a fixed-pitch portion rigidly supported on the hub and a movable portion hinged to the fixed portion adapted to vary the pitch, the fixed portion including the major part of the leading edge of the blade while the tip and the major part of the trailing edge are part of the movable portion, means for automatically causing the movable portion to alter its position to maintain the speed and torque exerted by the shaft substantially constant under varying operating conditions, said means including a centrifugally responsive mass operatively connected to said movable portion and a resilient hinge plate connecting the two portions of the blade and means for coupling together the movable portions of all the blades for synchronous movement.

3. An air screw comprising a driving shaft, a hub mounted thereon, blades carried by said hub, each blade composed of a fixed-pitch portion rigidly supported on the hub and a movable portion hinged to the fixed portion adapted to vary the pitch, the fixed portion including the major part of the leading edge of the blade while the tip and the major part of the trailing edge are part of the movable portion, means for automatically causing the movable portion to alter its position to maintain the speed and torque exerted by the shaft substantially constant under varying operating conditions, said means including a centrifugally responsive mass operatively connected to said movable portion and a connection between the blade sections comprising a resilient hinge plate at one point and a hinge pin at another point near the trailing edge, and means for coupling together the movable portions of all the blades for synchronous movement.

4. An air screw comprising a rotating driving shaft, a hub mounted on said shaft, blades carried by said hub, each blade being composed of a fixed and a movable portion, the fixed portion which includes the major part of the leading edge of the blade being attached to the hub so as to maintain its pitch constant, the movable portion including the tip and the major part of the trailing edge of the blade, a hinge supporting the movable portion on the fixed portion in a manner to allow the movable part to be tilted to vary its pitch, a centrifugally responsive weight mounted on said movable portion, the center of mass of said weight lying ahead of a plane normal to the shaft intersecting the hinge near the weight.

5. An air screw comprising a rotating driving shaft, a hub mounted on said shaft, blades carried by said hub, each blade being composed of a fixed and a movable portion, the fixed portion including the major part of the leading edge of the blade being attached to the hub so as to maintain a constant pitch, the movable portion including the tip and the major part of the trailing edge of the blade, a resilient plate hinge supporting the movable portion on the fixed portion to allow the movable part to be tilted to vary its pitch, a centrifugally responsive weight mounted on said movable portion, the center of mass of said weight lying ahead of the plane that is normal to the shaft and intersects the plate hinge near the weight.

6. An air screw comprising a rotating driving shaft, a hub mounted on said shaft, blades carried by said hub, each blade being composed of a fixed and a movable portion, the fixed portion which includes the major part of the leading edge of the blade being rigidly attached to the hub so as to maintain its pitch constant, the movable portion including the tip and the major part of the trailing edge of the blade, a hinge supporting the movable portion on the fixed portion in a manner to allow the movable part to be tilted to vary its pitch, a centrifugally responsive weight mounted on said movable portion in a plane normal to the hinge in such manner that the center of mass of the weight lies ahead of another plane normal to the shaft passing through the same point on the hinge.

7. An air screw comprising a rotating driving shaft, a hub mounted on said shaft, blades carried by said hub, each blade being composed of a fixed and a movable portion, the fixed portion which includes the major part of the leading edge of the blade being rigidly attached to the hub so as to maintain its pitch constant, the movable portion including the tip and the major part of the trailing edge of the blade, a resilient plate hinge supporting the movable portion on the fixed portion in a manner to allow the movable part to be tilted to vary its pitch, a centrifugally responsive weight mounted on said movable portion in a plane normal to the hinge in such manner that the center of mass of the weight lies ahead of another plane normal to the shaft passing through the same point on the center of the hinge plate.

8. An air screw adapted to automatically alter its pitch under varying operating conditions so as to maintain a constant number of revolutions per minute under constant torque having, in combination, a hub; blades, the major part of each being rigidly attached to the hub and having a fixed pitch; a hinge attached to the major part of the blade and forming an acute angle with the blade axis; a movable blade section which includes the blade tip, most of the trailing edge, and little of the leading edge attached to the hinge; a centrifugally responsive mass attached to that part of the movable blade section nearest the hub.

9. An air screw adapted to automatically alter its pitch under varying operating conditions so as to maintain a constant number of revolutions per minute under constant torque having, in combination, a hub; blades, the major part of each blade being rigidly attached to the hub and having a fixed pitch; a hinge attached to the major part of the blade and forming an acute angle with the blade axis; a movable blade section which includes the blade tip, most of the trailing edge, and little of the leading edge attached to the hinge; a centrifugally responsive mass attached to that part of the movable blade section nearest the hub; and resilient means connecting the movable and major section of the blade stressed by the relative movement of these two elements.

10. An air screw adapted to automatically alter its pitch under varying operating conditions so as to maintain a constant number of revolutions per minute under constant torque having, in combination, a hub; blades, the major part of each blade being rigidly attached to the hub and having a fixed pitch; a flexible plate attached to an edge of the major blade section and forming an acute angle with the blade axis; a movable blade section which includes the blade tip, most of the trailing edge and little of the leading edge attached to the plate in such manner that the plate is stressed by movement of the movable section; and a centrifugally responsive mass attached to that part of the movable blade section nearest the hub.

11. An air screw adapted to automatically alter its pitch under varying operating conditions so as to maintain a constant number of revolutions per minute under constant torque having, in combination, a hub; blades, the major part of each being rigidly attached to the hub and having a fixed pitch; a flexible plate attached to an edge of the major blade section forming an acute angle with the blade axis and located relatively far from the hub; a hinge attached to the same edge and located relatively near the hub; a movable blade section which includes the blade tip, most of the trailing edge and little of the leading edge attached to both said plate and hinge in such manner that the plate is stressed by movement of the movable section; and a centrifugally responsive mass attached to that part of the movable blade section nearest the hub.

12. An air screw adapted to automatically alter its pitch under varying operating conditions so as to maintain a constant number of revolutions per minute under constant torque having, in combination, a hub; blades, the major part of each being rigidly attached to the hub and having a fixed pitch; a hinge attached to the major part of the blade and forming an acute angle with the blade axis; a movable blade section which includes the blade tip, most of the trailing edge, and little of the leading edge attached to the hinge; a centrifugally responsive mass attached to that part of the movable blade section nearest the hub; and means for adjusting the position of the mass relative to the plane of the movable section before operation of the air screw.

13. An air screw adapted to automatically alter its pitch under varying operating conditions so as to maintain a constant number of revolutions per minute under constant torque having, in combination, a hub; blades, the major part of each being rigidly attached to the hub and having a fixed pitch; a flexible plate attached to an edge of the major blade section and forming an acute angle with the blade axis, a movable blade section which includes the blade tip, most of the trailing edge and little of the leading edge attached to the plate in such manner that the plate is stressed by movement of the movable section; a centrifugally responsive mass attached to that part of the movable blade section nearest the hub; and means for adjusting the position of the mass relative to the plane of the movable section before operation of the air screw.

14. An air screw adapted to automatically alter its pitch under varying operating conditions so as to maintain a constant number of revolutions per minute under constant torque having, in combination, a hub; blades, the major part of each being rigidly attached to the hub and having a fixed pitch; a flexible plate attached to an edge of the major blade section forming an acute angle with the blade axis and located relatively far from the hub; a hinge attached to the same edge and located relatively near the hub; a movable blade section which includes the blade tip, most of the trailing edge and little of the leading edge attached to both said plate and hinge in such manner that the plate is stressed by movement of the movable section; a centrifugally responsive mass attached to that part of the movable blade section nearest the hub; and means for adjusting the position of the mass relative to the plane of the movable section before operation of the air screw.

15. An air screw adapted to automatically alter its pitch under varying operating conditions so as to maintain a constant number of revolutions per minute under constant torque having, in combination, a hub; blades, the major part of each being rigidly attached to the hub and having a fixed pitch; a hinge attached to the major part of the blade and forming an acute angle with the blade axis; a movable blade section which includes the blade tip, most of the trailing edge, and little of the leading edge attached to the hinge; a centrifugally responsive mass attached to that part of the movable blade section nearest the hub; and means for causing the movable sections of all blades to move in unison.

DAVID BIERMANN.

REFERENCES CITED

The following references are of record in the file of this patent:

UNITED STATES PATENTS

| Number | Name | Date |
|---|---|---|
| 1,556,012 | Flettner | Oct. 6, 1925 |
| 1,656,019 | Roberts | Jan. 10, 1928 |
| 1,786,644 | Davis | Dec. 30, 1930 |
| 1,871,124 | Landrum | Aug. 9, 1932 |
| 1,886,289 | Miller | Nov. 1, 1932 |
| 1,952,799 | Havill | Mar. 27, 1934 |
| 2,021,470 | Upson | Nov. 19, 1935 |
| 2,132,133 | Smith | Oct. 4, 1938 |
| 2,219,303 | Fraser | Oct. 29, 1940 |

FOREIGN PATENTS

| Number | Country | Date |
|---|---|---|
| 622 | Great Britain | Jan. 14, 1915 |
| 134,569 | Great Britain | Oct. 27, 1919 |
| 550,227 | Great Britain | Dec. 30, 1942 |